United States Patent [19]

Twardowska et al.

[11] Patent Number: 5,417,751
[45] Date of Patent: May 23, 1995

[54] HEAT CURED FOUNDRY BINDERS AND THEIR USE

[75] Inventors: Helena Twardowska; Heimo J. Langer, both of Columbus, Ohio

[73] Assignee: Ashland Oil, Inc., Columbus, Ohio

[21] Appl. No.: 144,237

[22] Filed: Oct. 27, 1993

[51] Int. Cl.⁶ .............................................. B28B 7/34
[52] U.S. Cl. .................... 106/38.3; 106/38.9
[58] Field of Search ................ 106/38.3, 38.9

[56] References Cited

U.S. PATENT DOCUMENTS

| | | | |
|---|---|---|---|
| 4,357,165 | 11/1982 | Helferich et al. | 106/38.3 |
| 4,432,798 | 2/1984 | Helferich et al. | 106/38.3 |
| 4,533,393 | 8/1985 | Neuschaeffer et al. | 106/38.3 X |

OTHER PUBLICATIONS

Dehydration–Rehydration and Other Related Property Changes of Alumino–Silicate Gels, N. K. Mitra, S. Ghatak, R. Ghosh Dastidar and S. Gupta, Dept. of Chem. Technology, University of Science & Technology, 92 Acharyya Profulla Chandra Road, Calcutta–700 009, vol. 43(1), Jan.–Feb. 1984, pp. 11–14.

Reclamation of a New Inorganic, No–Bake Binder, G. J. Bolton, The Duriron Co., Dayton, Ohio, AFS Transactions, vol. 91, 1983, pp. 95–100.

An Introduction to the SAH Binder System, G. J. Bolton, Duriron Co., Inc., R. S. Doles, Nalco Chem. Co., F. M. McNally, Nalco Chem. Co., and D. A. Shackelford, Nalco Chem. Co., AFS Transactions, vol. 91, 1983, pp. 675–680.

*Primary Examiner*—Karl Group
*Attorney, Agent, or Firm*—David L. Hedden

[57] ABSTRACT

This invention relates to heat-cured foundry binders comprising in admixture (1) a source of soluble silica, and (2) a source of soluble alumina, such that the source of silica, source of alumina, or both contain an alkali metal. The binder components form a saturated solution when they are mixed with an aggregate. The resulting mix is shaped and heated at an elevated temperature to form a cured foundry shape. Heat is applied by warm air with warm-box equipment, baking in an oven, microwave, and preferably from hot-box equipment.

3 Claims, 2 Drawing Sheets

ALUMINO-SILICATE HYDROGEL

CRYSTALLINE ALUMINO-SILICATE

HEAT CURED FOUNDRY BINDERS AND THEIR USE

FIELD OF THE INVENTION

This invention relates to heat cured foundry binders comprising in admixture (a) a soluble source of silica, and (b) a soluble source of alumina, such that the source of silica, source of alumina, or both contain an alkali metal. The binder components form a saturated solution when they are mixed with an aggregate. The resulting mix is shaped and heated at an elevated temperature to form a cured foundry shape bonded together by a crystalline bonding phase. Heat is applied by warm air, baking in an oven, microwave, or preferably from hot-box equipment.

BACKGROUND OF THE INVENTION

The reaction between a soluble silica source and a soluble alumina source for making cation exchange systems and molecular sieves is known. However, the reaction product can vary widely depending upon the molar ratios of silica and alumina, and the reaction conditions.

U.S. Pat. No. 4,357,165 describes how to make self-setting, no-bake foundry binders, based upon a soluble silica source and a soluble alumina source, which cure under ambient conditions. These binders are amorphous hydrogels and remain amorphous hydrogels after curing because the water in the solution is not substantially removed during the curing process. The patent states at column 9, line 66 to column 10, line 4 that no heating or baking of the mold is required, and that, in fact, such treatment may significantly reduce subsequent moisture resistance, storage strength, and resistance to scabbing if introduced before the mold has had a chance to cure. Again at column 11, lines 15–16, the patent states that it is found that high temperatures during the cure period can cause a decrease in tensile strength.

These binders have the following deficiencies:
(1) low strength and long setting time;
(2) excess of free alkalis which is disadvantageous for reclamation;
(3) poor humidity resistance;
(4) high binder level (up to 6 to 7 weight percent based upon the weight of the sand) is required for effective use; and
(5) calcined kaolin must be added to improve the hot strength.

Because of these deficiencies, these binder systems are not only impractical for self-setting, no-bake application, but are also useless for high production core and mold making.

SUMMARY OF THE INVENTION

The subject invention relates to heat cured foundry binders comprising in admixture:
(1) a soluble source of silica, and
(2) a soluble source of alumina, such that the source of silica, source of alumina, or both contain an alkali metal.

The binder components form a saturated solution when mixed with an aggregate. The resulting mix is shaped and cured by heating with warm air, baking in oven, microwave, and preferably in hot-box equipment to form a crystalline binding phase by dehydration during heating. Most of the water is removed from the binder during curing. The foundry mixes prepared with these binders have a benchlife of up to five hours.

These heat cured binders differ significantly from the self-setting binders disclosed in U.S. Pat. No. 4,357,165 (see FIG. 1) which are hydrogels and are cured at ambient temperature. The heat cured binders which are the subject of this invention form crystalline structures with a characteristic x-ray diffraction pattern (see FIG. 2), and are formed within a prescribed molar ratio of silica source and alumina source.

Foundry mixes are prepared by mixing the binder components with a foundry aggregate. In contrast to the foundry mixes of U.S. Pat. No. 4,357,165 which have zero or little benchlife, the foundry mixes made with the subject binders have a benchlife of up to five hours.

The foundry mixes are shaped into molds, cores, and assemblies thereof. In contrast to the foundry shapes made with the binders described in U.S. Pat. No. 4,357,165, the subject binders provide cured foundry shapes which set quickly at elevated temperatures, have good tensile strengths, do not require excess free alkali (which is disadvantageous for reclamation and shakeout), show good humidity resistance, are used in commercially acceptable binder levels (generally less than about 5 weight percent based upon the weight of the aggregate), and do not need calcined kaolin to improve the hot strength.

ENABLING DISCLOSURE AND BEST MODE

Figure 1:
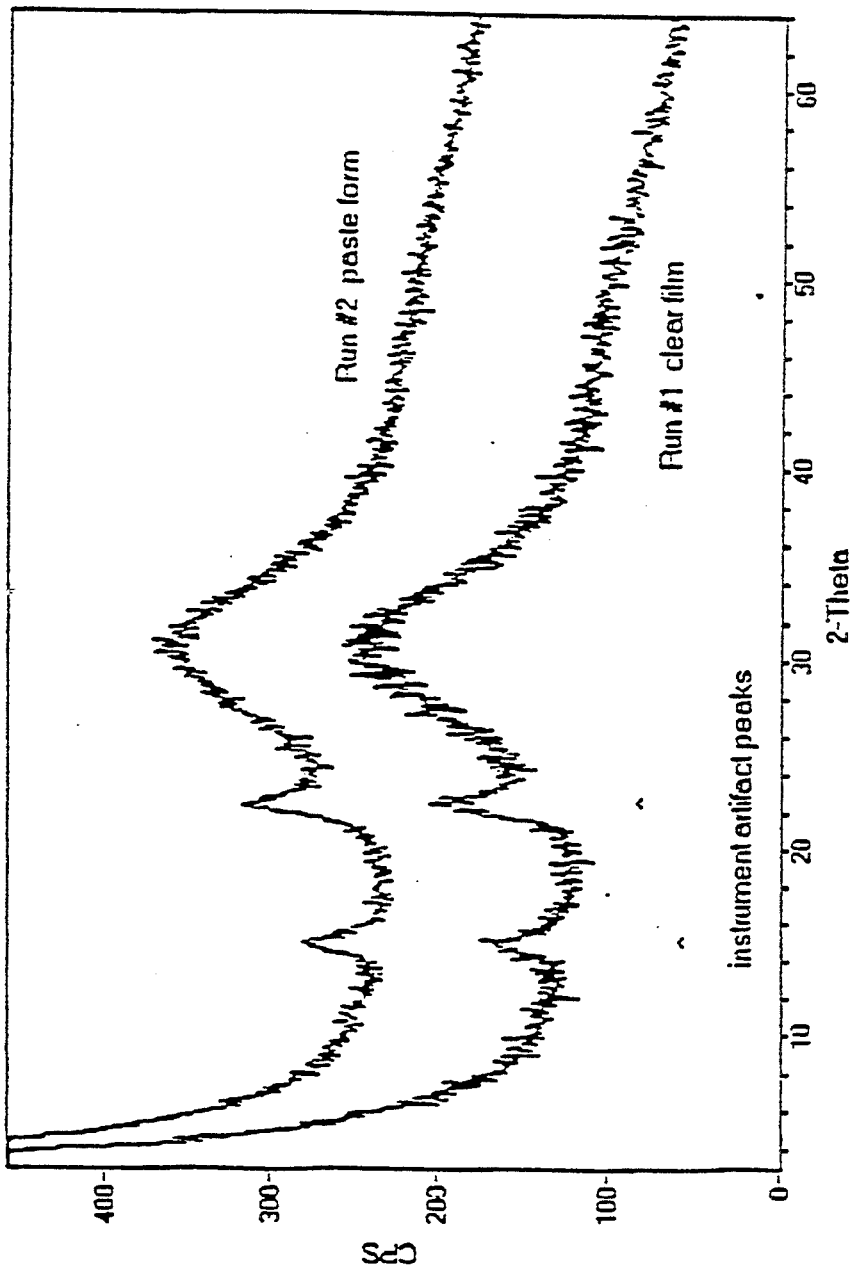
FIG. 1 is an x-ray diffraction pattern for a binder prepared in accordance with U.S. Pat. No. 4,357,165. The x-ray diffraction pattern (scan:3-64/.05/4/#1221, anode CU, zero=0.0) shows the binder is an amorphous, non crystalline material.
Figure 2:
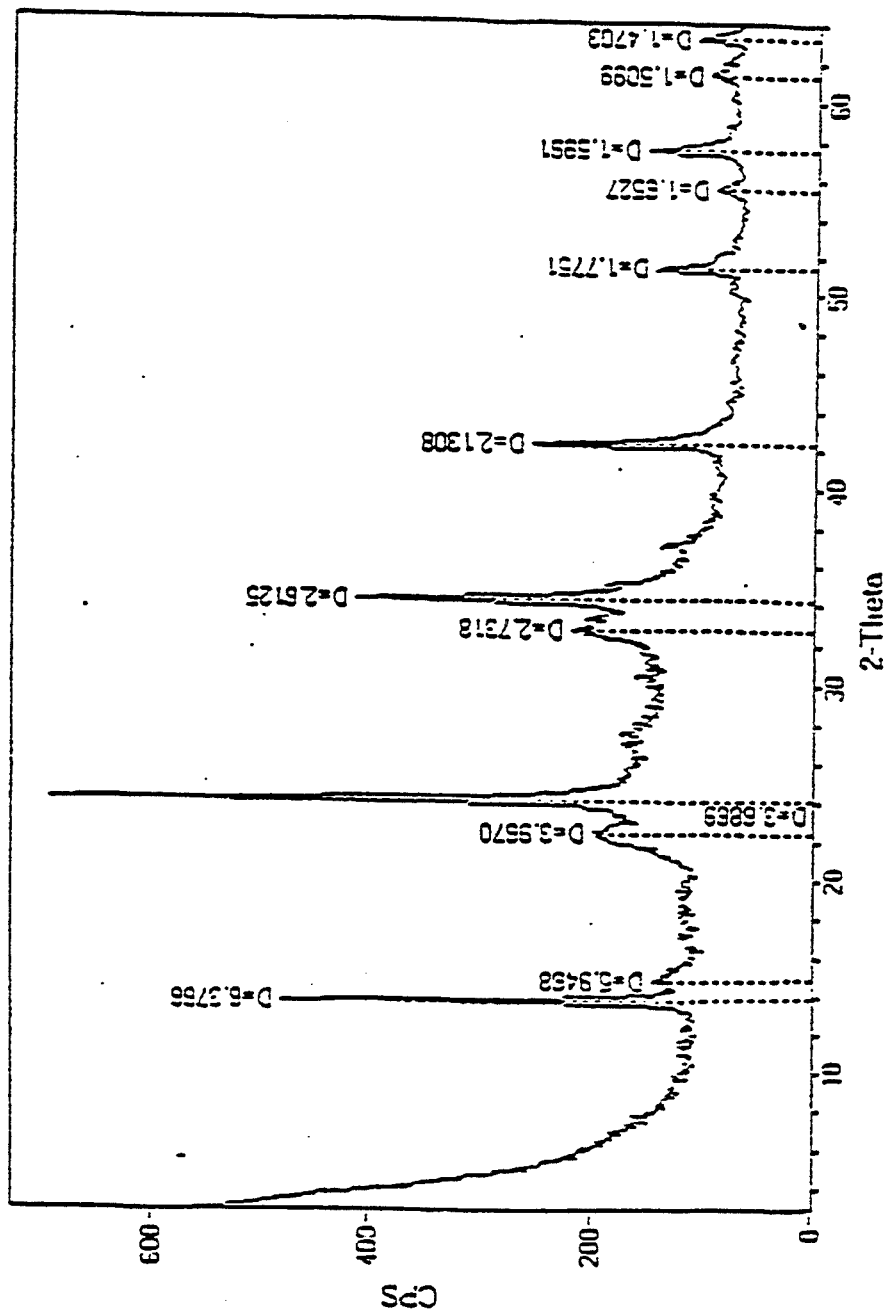
FIG. 2 is an x-ray diffraction pattern (scan:3-64/.05/4/#1221, anode CU, zero=0.0) for a binder prepared in accordance with the subject invention. The x-ray diffraction pattern shows the binder is a crystalline material.

The binder consists of two components: (1) a soluble silica source, and (2) a soluble alumina source, such that the source of silica, source of alumina, or both contain an alkali metal. Either component may be liquid or solid, but at least one component must be liquid. If either component is a solid component, the solid component will dissolve in the liquid component when the two components are mixed.

The soluble silica source is preferably an alkali silicate in aqueous solution, more preferably sodium silicate, colloidal silica, or solid silica, fumed or precipitated.

The soluble alumina source is preferably a solid alkali aluminate, or an alkali aluminate in solution, preferably where sodium aluminate is the alkali aluminate. Sodium aluminate can be used as a powder or as an aqueous solution without affecting curing time significantly. The powder, however, provides greater flexibility to the formulator when adding other components to the binder, but liquid components are easier to use.

Although various combinations of soluble silica source and soluble alumina source are possible, the best results are obtained when a colloidal silica solution is used with solid or liquid sodium aluminate.

The amount of solids in the aqueous solution containing the source of silica generally ranges from 40 to 55 weight percent, based upon the weight of the aqueous solution, preferably about 50 weight percent. The amount of solids in the source of alumina generally ranges from 40 to 50 weight percent, based upon the weight of the aqueous solution, preferably about 45 weight percent. The weight composition of alkali to alumina to silica, expressed as oxides, in the binder ranges from about 20 to about 40 weight percent alkali, from about 30 to about 50 weight percent alumina, and from about 20 to about 40 weight percent silica, said weight percents being based upon the total weight of the binder composition, preferably from about 28 to about 32 weight percent alkali, from about 38 to about 42 weight percent alumina, and from about 28 to about 35 weight percent silica. All weight ratios are expressed as if the source of silica and alumina were an oxide. This is common practice in the trade.

The source of silica is first applied to the aggregate when making a foundry mix. Then the source of alumina is mixed with the aggregate. The binder is preferably incorporated with sand at binder levels of 1 to 5 weight percent based upon the weight of the aggregate. The aggregate used to prepare the foundry mixes is that typically used in the foundry industry for such purposes or any aggregate that will work for such purposes. Generally, the aggregate will be sand which contains at least 70 percent by weight silica. Other suitable aggregate materials include zircon, olivine, alumina-silicate sand, chromite sand, and the like. Particularly preferred sand is silica sand having a fineness grade of 70 to 105 for instance. It is believed systems based on such sand will be particularly useful for high pressure die casting.

The sand mixture is compacted into cores and/or molds to form foundry shapes and heated to 100° C. to 300° C., preferably 150° C. to 250° C. until the foundry shapes can be handled without breaking, typically for 30 seconds to 20 minutes. Heating time is a function of the temperature and the heating process used. The heat source may be from the warm air, baking in a conventional oven, microwave, or preferably from hot-box equipment.

Foundry shapes prepared with the binder exhibit adequate immediate strengths for handling and show added strength development during 24 hours after curing. The heat-cured foundry shapes also exhibit excellent humidity resistance, much better than the foundry shapes made with the alumino-silicate no-bake binders shown in U.S. Pat. No. 4,357,165.

The following abbreviations are used in the Examples and Tables which follow:

bos=based on sand
BP=blow pressure (psi)
CH=constant humidity
CT=constant temperature
DT=dwell time (seconds)
Imm.=immediate
PI=Part I (source of silica)
PII=Part II (source of alumina)
RH=room humidity
RT=room temperature Examples A, B, and C are controls introduced for comparative purposes. The foundry shapes are allowed to cure at room temperature substantially in the manner as disclosed in U.S. Pat. No. 4,357,165. Examples 1–3 relate to a binder system wherein the Part II is a solid sodium aluminate while Examples 4–15 relate to a binder system using a liquid Part II. Examples 4–15 also show the effects of using different sand in binder systems where the Part I and Part II components are liquids. The conditions of use are set forth in Tables I to III which follow.

The foundry aggregate was prepared by mixing the sand with the Part I and Part II using a paddle style mixer (Hobart N-50) and cured with hot-box equipment.

The colloidal silica solution (Part I) contains about 50% solids and only small amount of sodium. The aqueous sodium aluminate solution (Part II) contained 45% solids and has a $Na_2O/Al_2O_3$ molar ratio of 1.26:1.0. The calculated molar ratio of $Na_2O:Al_2O_3:SiO_2$ is 1.3:1.0:1.3. Mixing the solutions of the silica source and the alumina source resulted in the formation of a saturated solution on the sand mix.

The sand mixes were made into the shape of dogbones for tensile strength measurements with a Thwing-Albert TA 500. The dogbone shapes were cured by heating them in hot-box equipment. The temperature of the heated core box, sand type, blow pressure, and the blow time are shown in the tables.

The humidity resistance was tested by placing samples which had cured for 24 hrs into a humidity chamber at 25° C. and 99% relative humidity (RH) for 1 hr. The test conditions and the results are summarized in the tables.

Metal castings made with the binders showed excellent resistance against erosion and veining while penetration and surface finish were good. Shakeout for aluminum castings was on the average about 45 seconds.

Examples A, B, and C are controls introduced for comparative purposes. In these examples, the foundry shape is allowed to cure at room temperature substantially in the manner as disclosed in U.S. Pat. No. 4,357,165. Table I indicates that tensile strengths of the foundry shapes made with binders according to U.S. Pat. No. 4,357,165 were unacceptable for commercial use.

TABLE I (Control)
(Foundry Shapes Made According to U.S. Pat. No. 4,357,165)

| | |
|---|---|
| Sand Lab: | 24° C., 40% RH |
| CT/CH Room: | 25° C., 50% RH |
| Sand: | Wedron 540 |
| Part I: | Sodium silicate solution ($SiO_2/Na_2O$ = 2.0) |
| Part II: | Sodium aluminate solution, $Na_2O/Al_2O_3$ = 1.26) |
| Part III: | 0.4% clay mixture bos as disclosed in U.S. Pat. No. 4,357,165 |
| Box Temp: | 21 to 22° C. |

| CONTROL | Binder Level PI/PII (% BOS) | TENSILE STRENGTHS | | | |
|---|---|---|---|---|---|
| | | Imm. | 1 hr | 24 hrs | 24 + 1 hrs |
| A | 2.0/2.0 | none | 12 | 59 | 22 |
| B | 2.0/1.6 | none | 10 | 35 | 10 |
| C | 1.6/2.0 | none | 12 | 42 | 27 |

Table II, Examples 1–3, shows the test results using binder systems within the scope of this invention where the Part I is liquid, Part II is solid, and hot-box equipment was used for curing. Foundry shapes with acceptable tensile strengths were made from this binder.

TABLE II (Tensile Strengths of Test Foundry Shapes Made with Solid Sodium Aluminate)

| | |
|---|---|
| Sand Lab: | 21° C., 51% RH |
| CT/CH Room: | 25° C., 50% RH |

TABLE II-continued (Tensile Strengths of Test Foundry Shapes Made with Solid Sodium Aluminate)

| Sand: | Badger |
| --- | --- |
| Part I: | LUDOX HS-40 colloidal silica solution/deionized water at a 64/36 ratio |
| Part II: | Solid NaAlO$_2$ (GU-55), 50 mesh (Na$_2$O/Al$_2$O$_3$ = 1.26) |
| Blow Time: | 0.5 sec. @ 60 psi |
| Box Temp: | 232° C. |

| EX | Binder Level PI/PII (% bos) | DT (sec) | TENSILE STRENGTHS |||| 
| --- | --- | --- | --- | --- | --- | --- |
| | | | Imm. | 1 hr. | 24 hrs | 24 + 1 hrs |
| 1 | 2.25/1.35 | 45 | 32 | 229 | 183 | 165 |
| 2 | 2.25/1.35 | 60 | 49 | 181 | 169 | 122 |
| 3 | 2.25/1.35 | 75 | 52 | 225 | 232 | 167 |

Examples 4–15 show test results using binder systems within the scope of this invention where both the Part I and Part II are liquid. Unless otherwise stated, the procedure used was the same as that set forth in Examples 1–3.

TABLE III (Foundry Shapes Made with Liquid Sodium Aluminate Using Different Sands)

| Sand Lab: | 21° C., 51% RH |
| --- | --- |
| CT/CH Room: | 25° C., 50% RH |
| Sand: | See Table IV |
| Part I: | LUDOX TM colloidal silica (50% solution) |
| Part II: | Sodium aluminate (45% solution Na$_2$O/Al$_2$O$_3$ = 1.26) |
| Ratio: | Part I/Part II is 1.00/2.50% bos |
| Blow Time: | 0.5 sec. @ 60 psi |
| Box Temp: | 232° C. |

| EX. | Sand | DT (sec) | TENSILE STRENGTHS ||||
| --- | --- | --- | --- | --- | --- | --- |
| | | | Imm. | 1 hr | 24 hrs | 24 + 1 hrs |
| 4 | WEDRON 540 | 45 | 3 | 276 | 195 | 84 |
| 5 | | 60 | 12 | 259 | 197 | 73 |
| 6 | | 90 | 17 | 202 | 173 | 92 |
| 7 | OKLAHOMA 90 | 45 | 33 | 374 | 286 | 127 |
| 8 | | 60 | 48 | 384 | 310 | 148 |
| 9 | | 90 | 41 | 375 | 287 | 198 |
| 10 | MANLEY 1L5W | 45 | 8 | 256 | 184 | 47 |
| 11 | | 60 | 12 | 251 | 194 | 85 |
| 12 | | 90 | 17 | 189 | 142 | 60 |
| 13 | BADGER 5574 | 45 | 5 | 331 | 226 | 120 |
| 14 | | 60 | 15 | 325 | 221 | 164 |
| 15 | | 90 | 19 | 232 | 207 | 161 |

The data in Table IV shows that Oklahoma 90 sand, a high purity silica sand having a fineness grade of 90, produces test foundry shapes which have higher immediate tensile strengths. It is believed systems based on such sand will be particularly useful for high pressure die casting. Other fine silica sands, such as Wedron 710 and Wedron 720, can also be used.

We claim:

1. A process for preparing a workable foundry shape comprising:
   (a) forming a foundry mix by mixing a foundry aggregate with a bonding amount of up to about 10 percent by weight, based upon the weight of the aggregate, of a binder composition comprising:
      (1) a water soluble source of silica, and
      (2) an alkali aluminate, such that the, composition, expressed as oxides, of alkali, alumina, and silica in the binder is from about 20 to about 40 weight percent alkali, from about 30 to about 50 weight percent alumina, and from about 20 to about 40 weight percent silica, said weight percents being based upon the total weight of the binder composition;
   (b) shaping the foundry mix of (a) into a foundry shape;
   (c) contacting the foundry shape of (b) with a source of heat at a temperature of 100° C. to 250° C.; and
   (d) allowing the foundry shape to harden into a workable foundry shape.

2. The process of claim 1 wherein the source of silicia is selected from the group consisting of sodium silicate, colloidal silicia solution, solid silicia, and mixtures thereof.

3. The process of claim 1 wherein the weight ratio of alkali to alumina to silicia in the binder ranges from about 28 to about 32 weight percent alkali, from about 38 to about 42 weight percent alumina, and from about 28 to about 35 weight percent silicia, said weight percents being based upon the total weight of the binder composition.

* * * * *